United States Patent
Eisenberger et al.

(10) Patent No.: US 11,971,115 B2
(45) Date of Patent: Apr. 30, 2024

(54) EDGE-COMPRESSED TILTING ARMATURE FOR A VEHICLE SOLENOID VALVE

(71) Applicant: Knorr-Bremse Systeme Fuer Nutzfahrzeuge GmbH, Munich (DE)

(72) Inventors: Andreas Eisenberger, Nuertingen (DE); Maher Matar, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 17/905,376

(22) PCT Filed: Mar. 1, 2021

(86) PCT No.: PCT/EP2021/055069
§ 371 (c)(1),
(2) Date: Aug. 31, 2022

(87) PCT Pub. No.: WO2021/190868
PCT Pub. Date: Sep. 30, 2021

(65) Prior Publication Data
US 2023/0119057 A1    Apr. 20, 2023

(30) Foreign Application Priority Data

Mar. 23, 2020  (EP) .................................. 20164763

(51) Int. Cl.
*F16K 31/06*  (2006.01)
*F16K 1/18*  (2006.01)
*H01F 7/14*  (2006.01)

(52) U.S. Cl.
CPC ............ *F16K 31/0682* (2013.01); *F16K 1/18* (2013.01); *H01F 7/145* (2013.01)

(58) Field of Classification Search
CPC ...... F16K 31/0682; F16K 1/18; F16K 1/2014; F16K 1/222; H01F 7/145; H01F 7/14; H01F 2007/086
See application file for complete search history.

(56) References Cited

U.S. PATENT DOCUMENTS 3,722,531 A * 3/1973 Verhart ............... F15B 13/0405
                                                    137/271
4,825,526 A * 5/1989 Shenier .................. A41F 1/002
                                                    24/303

(Continued)

OTHER PUBLICATIONS

Anonymous. "5 euro cent coin" Nov. 5, 2018, Wikipedia, Retrieved from URL: https://web.archive.org/web/20190320065549/https://en.wikipedia.org/wiki/5_euro_cent_coin.

*Primary Examiner* — Craig J Price
*Assistant Examiner* — Andrew J Rost
(74) *Attorney, Agent, or Firm* — NORTON ROSE FULBRIGHT US LLP; Gerard A. Messina

(57) ABSTRACT

A tilting armature for a vehicle solenoid valve, including: a ferromagnetic tilting armature for the vehicle solenoid valve which, by establishment of a magnetic field, is configured to move the tilting armature into one of two positions such that a magnetic flux, associated with the magnetic field, through the tilting armature is in the position conducted through at least one surface of the tilting armature across a gap to form a closed flux loop, wherein the tilting armature is tiltable between the two positions about an axis of rotation that is fixed with respect to the vehicle solenoid valve; in which an enlargement of the at least one surface of the tilting armature by an edge upset of the tilting armature is configured to reduce a magnetic resistance through the gap. Also described are a related vehicle solenoid valve and a related method.

8 Claims, 4 Drawing Sheets

(56) References Cited

U.S. PATENT DOCUMENTS

| | | | | |
|---|---|---|---|---|
| 4,905,962 | A * | 3/1990 | Iljin | F16K 31/0682 251/129.21 |
| 5,139,226 | A * | 8/1992 | Baldwin | H01F 7/14 137/625.65 |
| 5,653,422 | A * | 8/1997 | Pieloth | F16K 31/0682 137/596.17 |
| 5,762,097 | A * | 6/1998 | Hettinger | F16K 31/0682 251/129.03 |
| 6,211,760 | B1 * | 4/2001 | Hammerich | F16K 31/10 335/251 |
| 6,726,173 | B2 * | 4/2004 | Hettinger | F16K 31/0641 251/129.2 |
| 7,857,283 | B2 * | 12/2010 | Gaiardo | F02M 21/0272 251/129.2 |
| 2007/0239042 | A1 | 10/2007 | Takahashi et al. | |
| 2008/0179553 | A1 * | 7/2008 | Walter | F16K 31/082 251/65 |
| 2018/0274692 | A1 * | 9/2018 | Kolbenschlag | F16K 31/0675 |
| 2019/0360609 | A1 | 11/2019 | Roether et al. | |

* cited by examiner

EDGE-COMPRESSED TILTING ARMATURE FOR A VEHICLE SOLENOID VALVE

FIELD OF THE INVENTION

The present invention relates to an edge-upset tilting armature in a vehicle solenoid valve, to a vehicle solenoid valve having an edge-upset tilting armature, and to a method for producing a tilting armature in a vehicle solenoid valve.

BACKGROUND INFORMATION

Solenoid valves are distinguished by the use of electrical conductor coils which, through the induction of magnetic fields, control forces in order to directly or indirectly control and/or hold positions of closure pistons for valve openings. Among the various types of construction of such valves, there exists a class of vehicle solenoid valves, that is to say solenoid valves for use for example in brake systems of vehicles, in which the magnetic field of a conductor coil pulls a ferromagnetic tilting armature, which directly or indirectly performs the function of the closure piston, in the direction of the coil in order to thus, depending on the configuration of the vehicle solenoid valve, either allow or prevent the flow of a fluid through the vehicle solenoid valve.

FIG. 3 shows, by way of example, a diagram relating to the functioning of such a vehicle solenoid valve. It is possible to see a section plane through the vehicle solenoid valve, which section plane encompasses the axis of an electrical conductor coil 210. Situated within the conductor coil 210 is a core 220 composed of ferromagnetic material (for example iron) for the purposes of amplifying the magnetic field. The conductor coil 210 is fitted into a cylindrical housing 230 which is likewise manufactured from a ferromagnetic material and which, at one end of the conductor coil 210 (on the right-hand side of the core 220 in the figure), forms a valve space (a cavity) which, in the section plane shown, assumes the width of the coil diameter. Here, a wall, situated opposite the conductor coil 210, of the valve space is penetrated by two openings 260 for a throughflow of a fluid. In the valve space, there is situated a conventional tilting armature 300, which in this example is adapted in circular-disk-shaped form to the cylinder cross section of the housing 230 or of the conductor coil 210 and which is of substantially rectangular cross section in the illustrated section plane and which, by a pivot connected to the housing 230, is rotatable about an axis of rotation 20 that is perpendicular to the section plane, and which, for example by a force action imparted by a spring 240 and in the absence of an electrical current in the conductor coil 210, closes off one of the openings 260 of the valve chamber in fluid-tight fashion. If the conductor coil 210 is electrically energized, a magnetic field is generated which, concentrated and amplified in the ferromagnetic core 220, attracts the ferromagnetic tilting armature 100. This leads to a rotational movement of the tilting armature 100 about a center of rotation 20. If the tilting armature 100 is situated in the position in which it has been pulled toward the core 220 to the maximum extent, the ferromagnetic housing 230 has the aim of establishing a closed magnetic loop 70 in order to maximize the pulling force between the core 220 and the tilting armature 100. The formation of a closed magnetic loop 70 with the greatest possible magnetic flux in this position in particular also has the effect of amplifying the force that moves the tilting armature 100 into said position. On the other hand, this means that an equal force can be achieved with less current. Thus, exemplary embodiments have the effect that the solenoid valves can be activated with less current, and the solenoid valves are nevertheless actuated with the same force.

In the presence of a throughflow of current, the magnetic pulling force exerted on the tilting armature 100 by the conductor coil 210 should be as high as possible in order to ensure reliable positioning of the tilting armature 100. Owing to several factors, the magnetic flux pertaining to the magnetic field flows into the various materials to different extents. One important factor is a specific characteristic of the material, the so-called permeability. The permeability of air, for example, is considerably lower than the permeability of ferromagnetic materials, for example of a core 220 composed of iron. The developer of a vehicle solenoid valve seeks as far as possible to generate a closed loop of ferromagnetic material components, or to avoid gaps such as the gap 250, in order that the magnetic flux can flow more easily and thus the maximum magnetic force between fixed and movable parts can be generated. In magnet systems such as the vehicle solenoid valve shown, in which some components of the magnetic chain must move freely, a magnetic loop 70 may however for example comprise a discernible air gap (such as in this case the gap 250). The air gap spacing between fixed and moving parts, such as a housing 230 composed of iron and a ferromagnetic tilting armature 100 composed of high-grade steel, must be optimized in accordance with the movement conditions and the effectiveness of the magnetic flux loop 70. In the figure illustrated, the force on the tilting armature 100 is increased as a result of the magnetic flux being guided through the ferromagnetic materials of the tilting armature 100 and of the housing 230, as a result of which a closed magnetic field loop 70 is established. Gaps, the formation of which is based on particular production tolerances, for example the gap 250 between tilting armature 100 and housing 230, which serves for ensuring the mobility of the tilting armature 100, act in this magnetic field loop 70 as magnetic resistances which reduce the pulling force exerted on the tilting armature 100. A greater electrical current is therefore necessary to achieve an equal magnetic force. Furthermore, the weaker fixation of the tilting armature 100 in its position at the core 220 then has an adverse effect on reliable functioning of the vehicle solenoid valve, for example owing to deflections resulting from vibrations that occur in the vehicle.

There is therefore a demand for a further optimization of the magnetic flux, for example by reduction of the magnetic resistances caused by material gaps in the magnetic loop. It is sought here to find as cost-efficient an optimization as possible.

SUMMARY OF THE INVENTION

At least a proportion of the above-stated problems may be solved by a tilting armature as described herein, a vehicle solenoid valve as described herein, and a method as described herein. The further descriptions define further advantageous embodiments of the subjects of the main embodiments.

The present invention relates to a ferromagnetic tilting armature for a vehicle solenoid valve which is configured to, by establishment of a magnetic field, move the tilting armature into one of two positions such that a magnetic flux, associated with the magnetic field, through the tilting armature is in this position conducted through at least one surface of the tilting armature across a gap in order to form a closed flux loop. Here, the tilting armature is configured to be tiltable between the two positions about an axis of rotation that is fixed with respect to the vehicle solenoid valve. The tilting armature is characterized by an enlargement of the at least one surface of the tilting armature by way of an edge upset of the tilting armature, configured to increase the magnetic flux through the gap or reduce the magnetic resistance.

In exemplary embodiments, the tilting armature has substantially the shape of an edge-upset disk with an area (which is for example circular-disk-shaped or polygonal) adapted to the housing cross section. In that position of the tilting armature which is stabilized by the magnetic field, the magnetic flux flows for example through an air gap between the lateral surface of the tilting armature and a housing, which has ferromagnetic material (for example iron), of the vehicle solenoid valve. The edge upset causes an enlargement of the lateral surface of the tilting armature and thus of the transition region between the lateral surface of the tilting armature and the housing. As a result of the edge upset, the height of the rim of the tilting armature is enlarged without increasing the overall thickness of the tilting armature. For the upsetting, use may be made of a pre-knurling technology, as is used in the processing of coins. Following the enlargement of the rim height, the magnetic overall resistance of the air gap in the region of the cylindrical part of the tilting armature, which faces toward the housing, decreases, as a result of which the magnetic flux through the gap is increased. Furthermore, the upsetting of the armature rim can at the same time be used as a calibration process for a diameter for a tilting armature blank, which itself may originate for example from a stamping process. The air gap spacing, which corresponds to a sum of tolerances from the part manufacturing process and the movement conditions, can be reduced in size, because the tolerances of the tilting armature diameter are smaller after the edge-upsetting process.

The axis of rotation about which the tilting movement of the tilting armature takes place may in this case run through a center of mass of the tilting armature, though may also run outside such a center of mass. In exemplary embodiments, the two positions of the tilting armature often differ by only a few (for example 4) angular degrees.

A pivot may for example be configured as a local depression of the tilting armature for the support of the tilting armature on a projection configured for the purpose, or may conversely be configured as a projection of the tilting armature for support in a depression, for example of a housing of the vehicle solenoid valve.

Optionally, the tilting armature is composed of a ferromagnetic high-grade steel, or comprises at least one such material.

Optionally, the tilting armature is furthermore mechanically connected to the rest of the vehicle solenoid valve by way of one or more pivots on the axis of rotation, which pivots are each configured as a spherical-cap joint.

Optionally, the tilting armature furthermore has one or more depressions or projections which are configured to allow the abutment or the mounting of one or more springs by which, in the absence of the magnetic field, the tilting armature is tilted into and held in the position into which it is not moved by the magnetic field.

Optionally, the tilting armature comprises one or more mounted or inserted molded parts composed of a material (for example a plastic) that is suitable for ensuring fluid-tight coverage of a valve opening and/or damping of an impact against the tilting armature.

Such a molded part may for example perform the function of a sealing element for a valve opening of the vehicle solenoid valve, and/or may be a damper element, which can attenuate impacts which occur for example as a result of vibrations of the vehicle and which deflect the tilting armature out of at least one of its two positions. The molded part may be fastened to the tilting armature or connected thereto, for example by structural measures or else by way of suitable adhesive materials.

Exemplary embodiments also relate to a vehicle solenoid valve having at least one valve opening and a tilting armature as described herein in any one of the preceding embodiments.

Here, the vehicle solenoid valve comprises at least one conductor coil which, when electrically energized, can generate a magnetic field for the movement of the tilting armature. The coil may in particular be wound around a core composed of ferromagnetic or magnetizable material (such as iron) for amplifying the magnetic field.

The vehicle solenoid valve furthermore comprises a housing composed of one or more parts, which housing also forms a valve space for the flow of a fluid (such as air) and the at least one valve opening and encloses the tilting armature and allows the movement thereof between the two positions. Here, the tilting armature may for example be arranged substantially orthogonally or else parallel with respect to the coil axis. Said tilting armature, in its two positions, need not directly close the valve opening but rather may cause the closure via further components of the vehicle solenoid valve, such as a valve piston that is moved by the tilting armature. The vehicle solenoid valve is furthermore configured to, when the conductor coil is electrically energized, establish a magnetic field that moves the tilting armature into one of the two positions, and furthermore to, in this position, conduct a magnetic flux through the tilting armature such that a closed flux loop is formed, by way of which the tilting armature is fixed in the position. Here, the flux may for example be conducted through a part of the housing which is composed of ferromagnetic or magnetizable material. The vehicle solenoid valve may furthermore comprise springs which move the tilting armature into the position into which the tilting armature is not moved by the magnetic field. Forces exerted on the tilting armature by the springs are overcome by the magnetic force on the tilting armature when the coil is electrically energized. As a result of the edge upset of the tilting armature, the force that moves the tilting armature is also amplified, such that, under otherwise identical conditions, less current has to be applied to electrically energize the coil for the movement of the tilting armature. Exemplary embodiments have coil lengths and/or a diameter of the tilting armature in the region of approximately 2 centimeters.

Optionally, the valve opening is closed in fluid-tight fashion in one of the two positions and is open, so as to allow a passage of fluid, in the other of the two positions.

The present invention also relates to a method for producing a tilting armature for a vehicle solenoid valve, which method is characterized by
  clamping a tilting armature blank into an edge forming machine;
  edge-upsetting the tilting armature blank in order to form a bulge of the tilting armature blank in an edge region, such that a tilting armature with an edge upset of predetermined size and shape is created.

The tilting armature blank may for example be stamped out of a plate. An edge-forming machine guides the tilting armature blank for example past a knurling tool which, by exertion of pressure, leads to a bulging of the material of the tilting armature in the region around a part of the surface of the tilting armature. In a position of the tilting armature in the vehicle solenoid valve in which the tilting armature is fixed by a magnetic field, said part of the surface then adjoins a gap, and a magnetic flux flows through the part of the surface of the tilting armature and the gap in order to form a closed flux loop. Methods known from coin production may advantageously be used for the edge upsetting of the tilting armature.

By the edge upsetting process, it is possible to manufacture the tilting armature blank with a greater nominal diameter whilst adhering to the upper tolerance limits. In this way, the tilting armature can, in the vehicle solenoid valve, be situated closer to the housing, for example, without influencing the movement conditions. Additionally, the upsetting of the tilting armature rim has the effect that the tilting armature contains more ferromagnetic material. The two effects, both a smaller gap spacing and more ferromagnetic material, increase the magnetic attraction force of the tilting armature on other ferromagnetic fixed parts of the vehicle solenoid valve, wherein the attraction force with respect to the conductor coil or with respect to the core of the conductor coil is of particular interest. In particular, it is thus also the case that, for the same electrical energization of the coil, the force with which the tilting armature is moved into the new position, for example counter to the pressure of holding springs or counter to an air pressure, is also intensified. Therefore, with an otherwise identical construction of the solenoid valve, less current needs to be imparted for the operation of the coil, which can ultimately lead to less expensive operation of the solenoid valve.

The exemplary embodiments of the present invention will be better understood from the following detailed description and the appended drawings of the various exemplary embodiments, which should however not be understood as limiting the disclosure to the specific embodiments, but serve merely for explanation and comprehension.

DETAILED DESCRIPTION

Figure 1A:
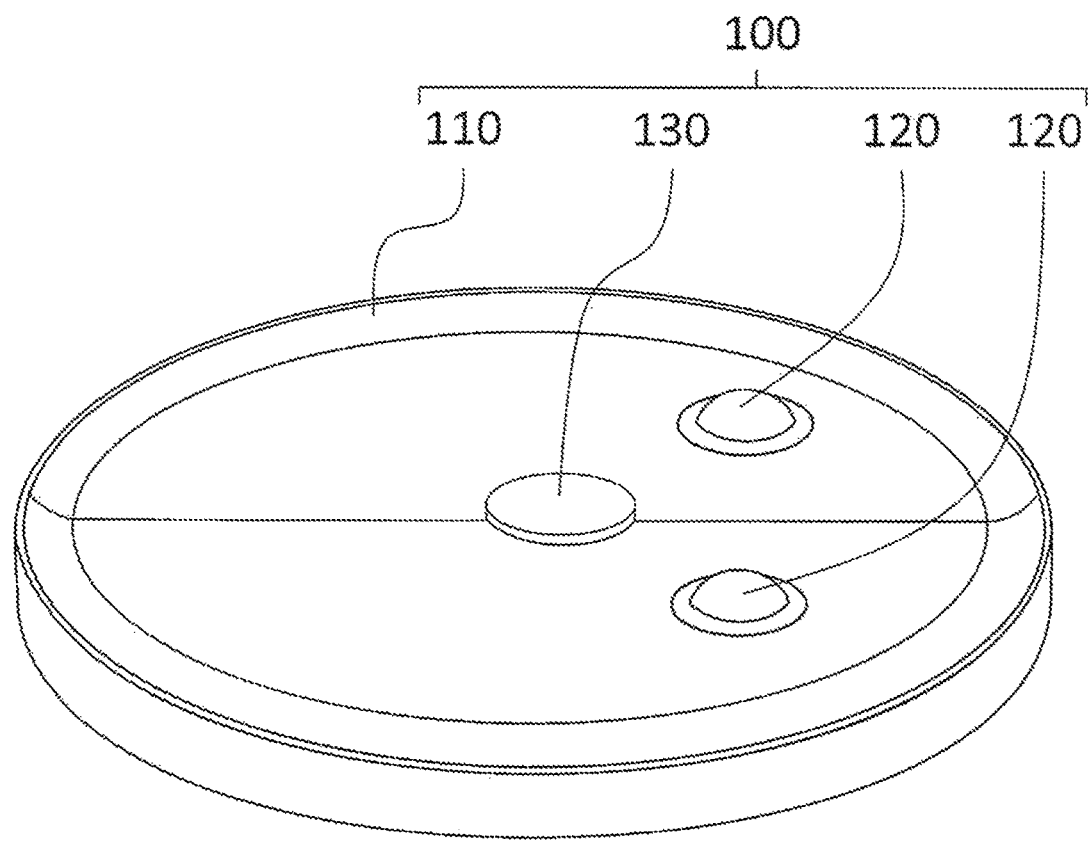
FIG. 1A shows a tilting armature with edge upset as an exemplary embodiment of the present invention.

FIG. 1A shows a view for an exemplary embodiment of a tilting armature 100 with edge upset 110. The tilting armature 100 is in this case substantially in the shape of a coin, above the surface of which heads of two spherical-cap joints 120 and a spring fixture 130 rise in relief. The tilting armature 100 is composed of ferromagnetic or magnetizable material, such as iron or a ferromagnetic high-grade steel. The diameter of the tilting armature 100 may for example be approximately 2 cm. The area of the tilting armature 100 is not restricted to the shape of a circular disk; it is rather also possible for tilting armatures 100 with, for example, a generally polygonal area to be subjected to edge upsetting.

Figure 1B:
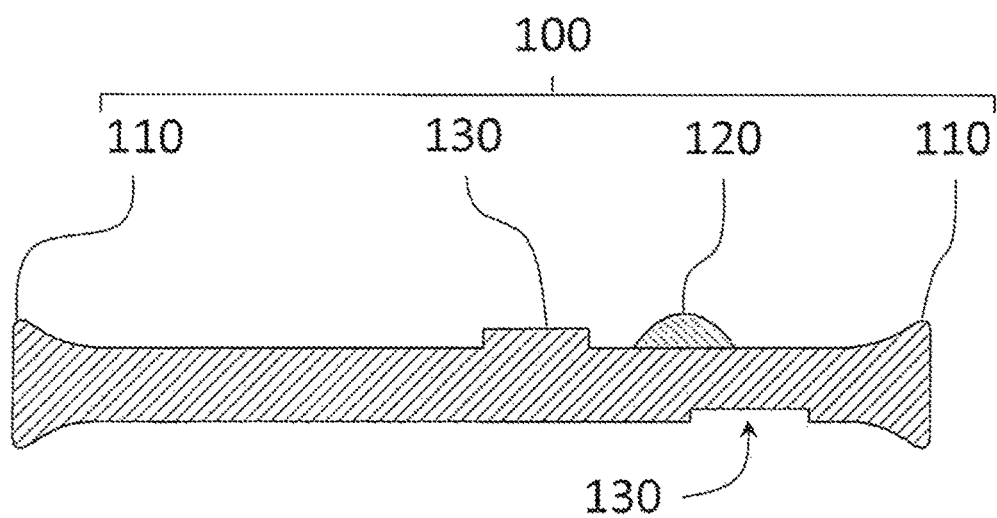
FIG. 1B shows a cross section through the tilting armature according to FIG. 1A.

FIG. 1B shows a section through the tilting armature 100 according to FIG. 1A. In this section, the edge upset 110 can be seen at each of the two ends; furthermore, an elevated and a recessed spring fixture 130, and the head of a spherical-cap joint 120, are illustrated.

Figure 2A:
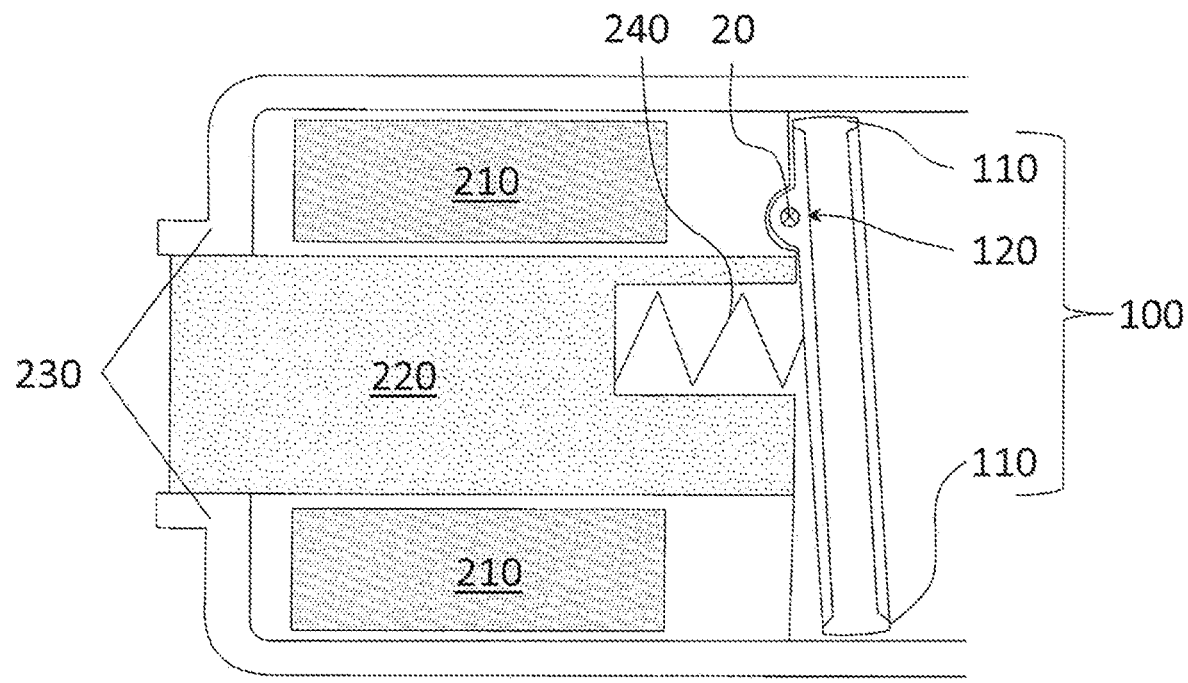
FIG. 2A shows a vehicle solenoid valve having a tilting armature with edge upset in a situation without a magnetic field.

FIG. 2A shows a section through an exemplary embodiment of a vehicle solenoid valve that comprises a tilting armature 100 with edge upset 110. The vehicle solenoid valve has substantially the shape of a cylinder; the section plane encompasses the cylinder axis. The figure shows a conductor coil 210 which is wound cylindrically around a core 220 composed of ferromagnetic or magnetizable material. The conductor coil 210 is in this case enclosed in non-ferromagnetic or non-magnetizable material, for example a plastic. The conductor coil 210 and the core 220 are jointly fitted into a housing 230, which is likewise composed of ferromagnetic or magnetizable material. The core 220 has a cavity for a spring 240 which pushes the tilting armature 100, which is attached transversely in front of the conductor coil 210, into one of two positions. The tilting armature 100 can in this case rotate about an axis of rotation 20, which is fixed with respect to the vehicle solenoid valve and which in the figure is perpendicular to the image plane. Said tilting armature may be held in its position by one or more further springs which bear against the right-hand side of the tilting armature 100 and which are not illustrated here. Likewise not illustrated in the figure are optional molded parts mounted onto or inserted into the tilting armature, which molded parts are for example intended to ensure a fluid-tight seal of a valve opening and/or damping of an impact. A situation is illustrated in which no electrical current is flowing through the conductor coil 210 and therefore no magnetic field is established. In this situation, under the pressure of the spring 240, the tilting armature 100 assumes a position which opens or closes a valve opening (not illustrated in the image) of the vehicle solenoid valve. Here, the opening and closing of the valve opening need not necessarily be performed by the tilting armature 100 directly, but may occur via further components in the valve space (not illustrated in more detail here) that adjoins the tilting armature 100 to the right. For example, the movement of the tilting armature 100 may for example cause the movement of a valve piston.

Figure 2B:
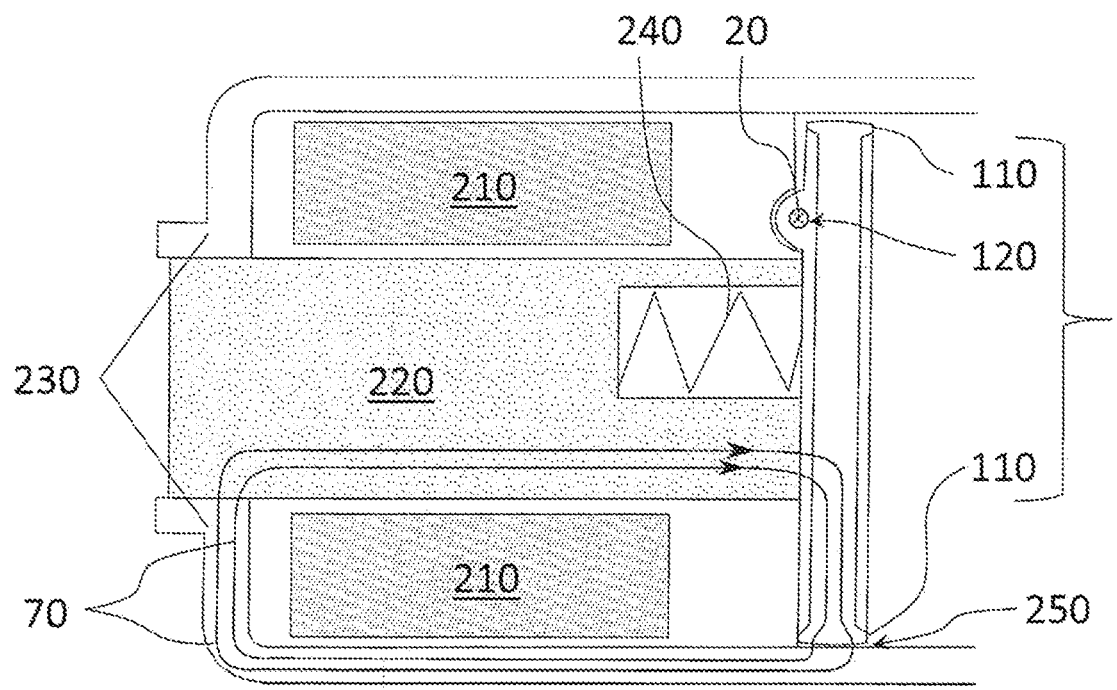
FIG. 2B shows a vehicle solenoid valve having a tilting armature with edge upset as in FIG. 2A, but in a situation without a magnetic field.
Figure 3:
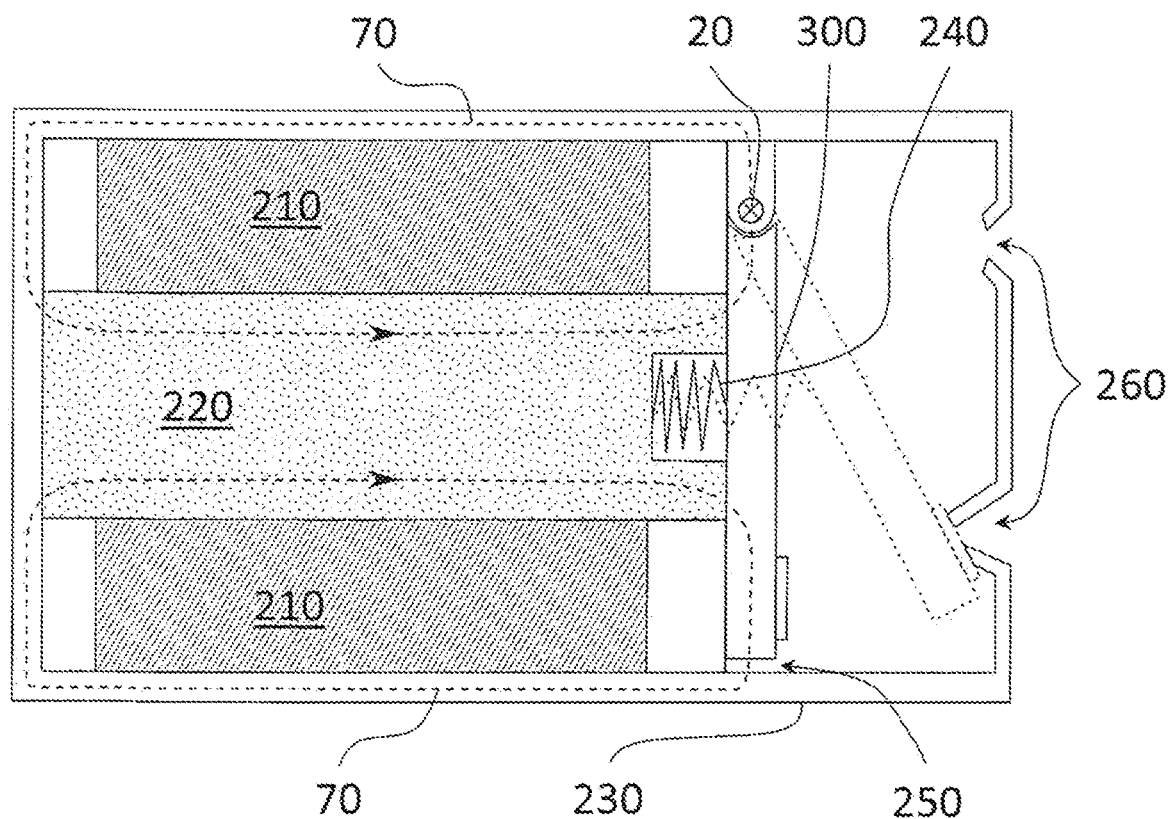
FIG. 3 shows a known diagram for a vehicle solenoid valve with tilting armature.

FIG. 2B shows the section illustrated in FIG. 2A for a situation in which an electrical current is flowing through the conductor coil 210. A magnetic field resulting from this is additionally amplified by the core 220 and pulls the tilting armature 100 toward the core 220 into the illustrated position counter to the force of the spring 240. In this position, the respectively open or closed valve opening discussed in the description of FIG. 2A is closed or opened respectively. This valve opening is not illustrated in FIG. 1B either; the closing and opening of the valve opening may again take place indirectly via further components (not illustrated) of the solenoid valve. In the position of the tilting armature 100 illustrated here, field lines of the magnetic field are guided through the ferromagnetic or magnetizable material of the core 220, of the tilting armature 100 and of the housing 230 and form closed loops 70. In these flux loops 70, the gap 250 acts as a magnetic resistance; it thus weakens the force with which the tilting armature 100 is held in its position by the magnetic field. The surface of the tilting armature 100 at the gap 250 is enlarged by the edge upset 110 of the tilting armature 100. This reduces the magnetic resistance of the gap 250 and thus promotes the force with which the tilting armature 100 is held in its position. Furthermore, the force that causes the tilting armature to be moved into said position is also increased. By contrast to conventional tilting armatures, the tilting armature according to exemplary embodiments is more easily movable. This is also advantageous in an initial stage of the tilting movement, that is to say the tilting movement can be initiated more easily (for example with less current).

Figure 4:
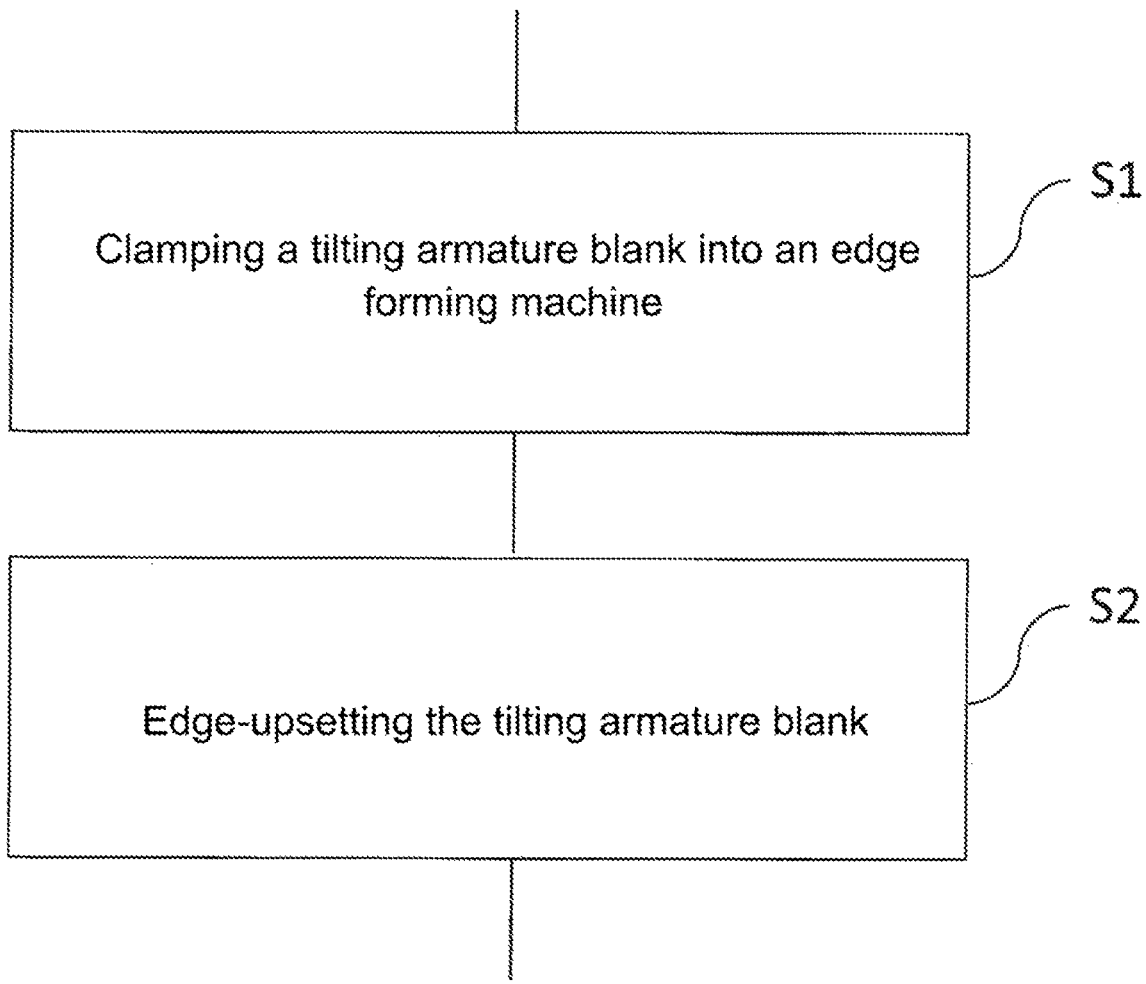
FIG. 4 shows steps of the method for producing a tilting armature for a vehicle solenoid valve.

FIG. 4 shows a diagram for two steps that characterize a process of production of a tilting armature 100 with edge upset 110 for a vehicle solenoid valve.

These two steps firstly comprise clamping S1 of a tilting armature blank into an edge forming machine. Such an edge forming machine may for example comprise two concentrically arranged rings which are moved against one another and which, in the side respectively facing toward the other ring, have a groove. In the step of the clamping S1, the tilting armature blank is positioned between the rings, with the surface that is to be upset in the grooves.

The second step that characterizes the method is an edge upsetting S2 of the tilting armature blank in order to form a bulge of the tilting armature blank in an edge region, such that a tilting armature 100 with an edge upset 110 of predetermined size and shape is created. In this step, the tilting armature blank is placed under pressure by way of a controlled reduction of the spacing between the two rings, and is uniformly bulged in an edge region by way of a reciprocal movement of the two rings. This method step may advantageously be performed in the presence of a particular temperature of the tilting armature blank, which temperature is for example adapted to the material of the tilting armature 100.

The steps of the clamping S1 and of the edge upsetting S2 can be incorporated into an existing manufacturing method for producing the tilting armature 100; it is intended to illustrate this by the open nature of the diagram shown in the figure.

The upsetting achieved by such a method leads to the desired surface enlargement for a better passage of the magnetic flux through a gap 250. At the same time, the method offers the possibility of a calibration of the size of the tilting armature 100 that results from the tilting armature blank by way of the method steps, such that the gap spacing can be additionally reduced without, for example, jeopardizing the mobility of the tilting armature 100 in the vehicle solenoid valve.

The features of the invention disclosed in the description, the claims and the figures may be essential both individually and in any desired combination to the realization of the invention.

THE LIST OF REFERENCE DESIGNATIONS IS AS FOLLOWS

20 Axis of rotation
70 Magnetic field line
100 Tilting armature
110 Edge upset
120 Spherical-cap joint
130 Spring fixture
210 Conductor coil
220 Core
230 Housing
240 Spring
250 Gap
260 Valve opening
300 Conventional tilting armature
S1 Method step of clamping
S2 Method step of edge upsetting

The invention claimed is:

1. A tilting armature for a vehicle solenoid valve, comprising:
a ferromagnetic tilting armature for the vehicle solenoid valve which, by establishment of a magnetic field, is configured to move the tilting armature into one of two positions such that a magnetic flux, associated with the magnetic field, through the tilting armature is in the position conducted through at least one surface of the tilting armature across a gap to form a closed flux loop, wherein the tilting armature is tiltable between the two positions about an axis of rotation that is fixed with respect to the vehicle solenoid valve;
wherein an enlargement of the at least one surface of the tilting armature by an edge upset of the tilting armature is configured to reduce a magnetic resistance through the gap,
wherein the tilting armature is in the shape of a circular disk, above a surface of which heads of two spherical-cap joints and a spring fixture rise in relief, and
wherein a surface of the tilting armature at the gap is enlarged by the edge upset of the tilting armature, so as to reduce a magnetic resistance of the gap, so as to promote a force with which the tilting armature is held in a position, and wherein the force that causes the tilting armature to be moved into the position is also increased.

2. The tilting armature of claim 1, wherein the tilting armature includes a ferromagnetic high-grade steel.

3. The tilting armature of claim 1, wherein the tilting armature is mechanically connectable to the vehicle solenoid valve by one or more pivots on the axis of rotation, wherein the pivots are each configured as a spherical-cap joint.

4. The tilting armature of claim 1, wherein the tilting armature has one or more depressions or projections to allow the abutment or the mounting of one or more springs by which, in the absence of the magnetic field, the tilting armature is tilted into and held in the position into which it is not moved by the magnetic field.

5. The tilting armature of claim 1, wherein the tilting armature has one or more mounted or inserted molded parts composed of a material that is suitable for ensuring a fluid-tight seal of a valve opening and/or damping of an impact against the tilting armature.

6. A vehicle solenoid valve, comprising:
at least one valve opening having a tilting armature, wherein the tilting armature includes:
a ferromagnetic tilting armature for the vehicle solenoid valve which, by establishment of a magnetic field, is configured to move the tilting armature into one of two positions such that a magnetic flux, associated with the magnetic field, through the tilting armature is in the position conducted through at least one surface of the tilting armature across a gap to form a closed flux loop, wherein the tilting armature is tiltable between the two positions about an axis of rotation that is fixed with respect to the vehicle solenoid valve;
wherein an enlargement of the at least one surface of the tilting armature by an edge upset of the tilting armature is configured to reduce a magnetic resistance through the gap, wherein the tilting armature is in the shape of a circular disk, above a surface of which heads of two spherical-cap joints and a spring fixture rise in relief, and wherein a surface of the tilting armature at the gap is enlarged by the edge upset of the tilting armature, so as to reduce a magnetic resistance of the gap, so as to promote a force with which the tilting armature is held in a position, and wherein the force that causes the tilting armature to be moved into the position is also increased.

7. The vehicle solenoid valve of claim 6, wherein the valve opening is closed in a fluid-tight manner in one of the two positions and is open, so as to allow a passage of fluid, in the other of the two positions.

8. A method for producing a tilting armature for a vehicle solenoid valve, the method comprising:
   clamping a tilting armature blank into an edge forming machine; and
   edge-upsetting the tilting armature blank to form a bulge of the tilting armature blank in an edge region, such that a tilting armature with an edge upset of predetermined size and shape is produced;
   wherein the tilting armature is tiltable between two positions about an axis of rotation that is fixed with respect to the vehicle solenoid valve,
   wherein the tilting armature is a ferromagnetic tilting armature for the vehicle solenoid valve which, by establishment of a magnetic field, is configured to move the tilting armature into one of the two positions such that a magnetic flux, associated with the magnetic field, through the tilting armature is in the position conducted through at least one surface of the tilting armature across a gap to form a closed flux loop, and
   wherein an enlargement of the at least one surface of the tilting armature by the edge upset of the tilting armature is configured to reduce a magnetic resistance through the gap,
   wherein the tilting armature is in the shape of a circular disk, above a surface of which heads of two spherical-cap joints and a spring fixture rise in relief, and
   wherein a surface of the tilting armature at a gap is enlarged by the edge upset of the tilting armature, so as to reduce a magnetic resistance of the gap, so as to promote a force with which the tilting armature is held in a position, and wherein the force that causes the tilting armature to be moved into the position is also increased.

* * * * *